(12) United States Patent
Green

(10) Patent No.: US 7,574,103 B2
(45) Date of Patent: Aug. 11, 2009

(54) AUTHORING OF COMPLEX AUDIOVISUAL PRODUCTS

(75) Inventor: Stuart Green, Sheffield (GB)

(73) Assignee: Zoo Digital Limited (GB)

( * ) Notice: Subject to any disclaimer, the term of this patent is extended or adjusted under 35 U.S.C. 154(b) by 1344 days.

(21) Appl. No.: 10/424,952

(22) Filed: Apr. 28, 2003

(65) Prior Publication Data

US 2003/0231857 A1 Dec. 18, 2003

Related U.S. Application Data

(60) Provisional application No. 60/383,825, filed on May 29, 2002.

(30) Foreign Application Priority Data

Apr. 30, 2002 (GB) .................................. 0209790.5

(51) Int. Cl.
*H04N 5/76* (2006.01)
*H04N 5/00* (2006.01)
(52) U.S. Cl. ......................................... 386/69; 386/125
(58) Field of Classification Search ..................... 386/1, 386/45–46, 95–96, 125–126, 69–70
See application file for complete search history.

(56) References Cited

U.S. PATENT DOCUMENTS 5,892,507 A 4/1999 Moorby et al.
6,100,881 A 8/2000 Gibbons et al.
6,453,459 B1 * 9/2002 Brodersen et al. ............ 717/100

FOREIGN PATENT DOCUMENTS

EP 0 871 177 A2 10/1998
WO WO 99/38098 7/1999

OTHER PUBLICATIONS

Combined Search and Examination Report under Sections 17 and 18(3) for UK Application No. GB 0309814.2 (Aug. 1, 2003).

* cited by examiner

*Primary Examiner*—Thai Tran
*Assistant Examiner*—Nigar Chowdhury
(74) *Attorney, Agent, or Firm*—Daniels W. Roberts; Law Office of Daniel W. Roberts

(57) ABSTRACT

An authoring method for creating an audiovisual product. The method has three main stages. The first stage defines components implicitly representing functional sections of audiovisual content and transitions that represent movements between components. The second stage expands the components and transitions to provide a set of explicitly realised AV assets and an expanded intermediate datastructure of nodes and links. Each node is associated with one of the AV assets and the links represent movement from one node to another. The third stage creates the audiovisual product in a predetermined output format, e.g. DVD-Video, using the AV assets and the expanded intermediate datastructure of the nodes and the links.

69 Claims, 14 Drawing Sheets

| Event | From | To | Conditions | Description |
|---|---|---|---|---|
| E1 | Start | Welcome | Insert DVD | Start |
| E2 | Welcome | Main Menu | Timed event | Display Welcome for 15 seconds |
| E3 | Main Menu | Select Product by Category | Category selected | User chooses a search category |
| E4 | Main Menu | Select Product by Name | Name selected | User chooses a search category |
| E5 | Main Menu | Select Product by Part Code | Part Code selected | User chooses a search category |
| E6 | Select Product by Category | Product Info | Product selected | The user selects a product from a list organised by category |
| E7 | Select Product by Name | Product Info | Product selected | The user selects a product from a list organised by name |
| E8 | Select Product by part code | Product Info | Product selected | The user selects a product from a list organised by part code |
| E9 | Product info | Main Menu | Return to Menu selected | User wants to select a new product or exit |
| E10 | Product Info | Detailed Product Info | Details selected | User wants to see more info |
| E11 | Product Info | Detailed photo | Photo selected | User wants to see big photo |
| E12 | Detailed product info | Product Info | Product info selected | User wants to see summary info |
| E13 | Detailed product info | Main Menu | Return to Menu selected | User wants to select a new product or exit |
| E14 | Detailed product info | Detailed photo | Photo selected | User wants to see big photo |
| E15 | Detailed photo | Detailed product Info | Details selected | User wants to see more info |
| E16 | Detailed Photo | Main Menu | Return to Menu selected | User wants to select a new product or exit |
| E17 | Detailed Photo | Product Info | Product info selected | User wants to see summary info |
| E18 | Main Menu | End | Exit selected | End |

Fig. 6

AUTHORING OF COMPLEX AUDIOVISUAL PRODUCTS

RELATED APPLICATIONS

This application claims the benefit of U.S. Provisional Patent Application Ser. No. 60/383,825, filed May 29, 2002, the disclosure of which is incorporated herein by reference in its entirety.

FIELD OF THE INVENTION

The present invention relates in general to a method and apparatus for authoring complex audiovisual products.

BACKGROUND OF THE INVENTION

In general terms, it is desired to assemble many small sections of raw audio and video content (i.e. sound clips and video clips) to form a finished audiovisual product, by way of an authoring process. However, in many environments a considerable degree of specialist knowledge and time must be invested in the authoring process in order to achieve a desirable finished audiovisual product. These problems are exacerbated where the audiovisual product has a complex navigational structure or requires many separate raw content objects.

As a simple example, a feature movie or television program typically has a straightforward linear navigational sequence of individual scenes. By contrast, it is now desired to develop new categories of audiovisual products which have a much more complex navigational structure, such as a movie with many scene choices or different movie endings, and/or which have a large number of individual scenes, such as an interactive quiz game with say one thousand individual quiz questions.

In one preferred embodiment, the present invention relates to authoring of audiovisual content into a form compliant with a specification for DVD-video and able to be recorded on an optical disc recording medium.

An optical disc is a convenient storage media for many different purposes. A digital versatile disc (DVD) has been developed with a capacity of up to 4.7 Gb on a single-sided single-layer disc, and up to 17 Gb on a double-sided double-layer disc. There are presently several different formats for recording data onto a DVD disc, including DVD-video, DVD-audio, and DVD RAM, amongst others. Of these, DVD-video is particularly intended for use with pre-recorded video content, such as a motion picture. As a result of the large storage capacity and ease of use, DVD discs are becoming popular and commercially important. Conveniently, a DVD-video disc is played using a dedicated playback device with relatively simple user controls, and DVD players for playing DVD-video discs are becoming relatively widespread. More detailed background information concerning the DVD-video specification is available from DVD Forum at www.dvdforum.org.

Although DVD-video discs and DVD-video players are becoming popular and widespread, at present only a limited range of content has been developed. In particular, a problem arises in that, although the DVD specification is very flexible, it is also very complex. The process of authoring content into a DVD-video compatible format is relatively expensive and time consuming. In practice, the flexibility and functions allowed in the DVD-video specification are compromised by the expensive and time consuming authoring task. Consequently, current DVD-video discs are relatively simple in their navigational complexity. Such simplicity can impede a user's enjoyment of a DVD-video disc, and also inhibits the development of new categories of DVD-video products.

DESCRIPTION OF THE RELATED ART

An example DVD authoring tool is disclosed in WO 99/38098 (Spruce Technologies) which provides an interactive graphical authoring interface and data management engine. This known authoring tool requires a relatively knowledgeable and experienced operator and encounters difficulties when attempting to develop an audiovisual product having a complex navigational structure. In particular, despite providing a graphical user interface, the navigational structure of the desired DVD-video product must be explicitly defined by the author. Hence, creating a DVD-video product with a complex navigational structure is expensive, time-consuming and error-prone.

SUMMARY OF THE INVENTION

An aim of the present invention is to provide a convenient and simple method and apparatus for authoring an audio-visual product.

An aim of the preferred embodiments of the present invention is to provide a method and apparatus able to create an audio-visual product having a complex navigational structure and/or having many individual content objects, whilst reducing a time required for authoring and minimising a need for highly skilled operators.

Another preferred aim is to provide an authoring tool which is intuitive to use and is highly flexible.

An aim of particularly preferred embodiments of the invention is to allow efficient creation of audio-visual products such as DVD-video products that run on commonly available DVD-video players.

According to the present invention there is provided a method and apparatus as set forth in the appended claims. Preferred features of the invention will be apparent from the dependent claims, and the description which follows.

In a first aspect of the present invention there is provided an authoring method for use in creating an audiovisual product, comprising the steps of: defining a plurality of components, the components implicitly representing functional sections of audiovisual content with respect to one or more raw content objects, and a plurality of transitions that represent movements between the plurality of components; expanding the plurality of components and the plurality of transitions to provide a set of explicitly realised AV assets and an expanded intermediate datastructure of nodes and links, where each node is associated with an AV asset of the set and the links represent movement from one node to another; and creating an audiovisual product in a predetermined output format, using the AV assets and the expanded intermediate datastructure of the nodes and the links.

In a second aspect of the present invention there is provided an authoring method for use in creating a DVD-video product, comprising the steps of: creating a plurality of components representing parameterised sections of audiovisual content, and a plurality of transitions representing movements between components; expanding the plurality of components and the plurality of transitions to provide a set of AV assets and an expanded datastructure of nodes and links, where each node is associated with an AV asset of the set and the links represent movement from one node to another; and creating a DVD-video format datastructure from the AV assets, using the nodes and links.

In a third aspect of the present invention there is provided an authoring method for use in creating an audiovisual product according to a DVD-video specification, comprising the steps of: generating a set of AV assets each comprising a video object, zero or more audio objects and zero or more sub-picture objects, and an expanded datastructure of nodes and links, where each node is associated with one AV asset of the set and the links represent navigational movement from one node to another; and creating a DVD-video format datastructure from the set of AV assets, using the nodes and links; the method characterised by the steps of: creating a plurality of components and a plurality of transitions, where a component implicitly defines a plurality of AV assets by referring to a presentation template and to items of raw content substitutable in the presentation template, and the plurality of transitions represent navigational movements between components; and expanding the plurality of components and the plurality of transitions to generate the set of AV assets and the expanded datastructure of nodes and links.

In another aspect the present invention there is provided a recording medium having recorded thereon computer implementable instructions for performing any of the methods defined herein.

In yet another aspect of the present invention there is provided a recording medium having recorded thereon an audiovisual product authored according to any of the methods defined herein.

BRIEF DESCRIPTION OF THE DRAWINGS

For a better understanding of the invention, and to show how embodiments of the same may be carried into effect, reference will now be made, by way of example, to the accompanying diagrammatic drawings in which:

FIG. 6 shows the example of FIG. 5 in a tabular format;

DETAILED DESCRIPTION OF THE INVENTION

Figure 1:
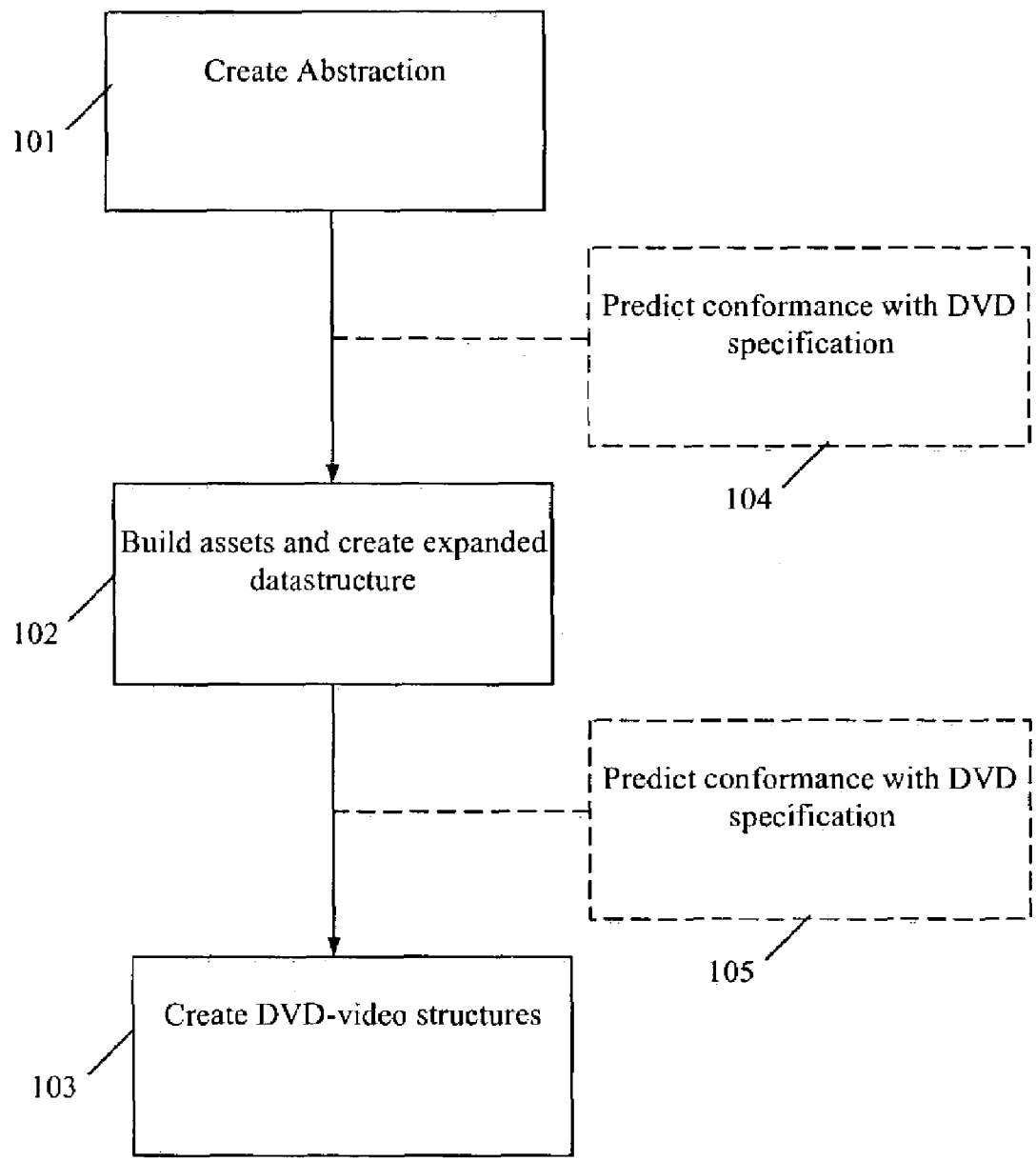
FIG. 1 is an overview of an authoring method according to a preferred embodiment of the present invention.

FIG. 1 shows an overview of an authoring method according to a preferred embodiment of the present invention.

The present invention is useful when authoring many types of audiovisual products, and in particular when complex navigational structure or content are involved.

As one example, the present invention is applicable to authoring of video on demand products delivered remotely from a service provider to a user, such as over a computer network or other telecommunications network. Here, the present invention is especially useful in authoring interactive products, where user choices and responses during playback of the product dictate navigational flow or content choices.

As another example, the present invention is particularly suitable for use in the authoring of an audiovisual product compliant with a DVD-video specification. This example will be discussed in more detail below in order to illustrate the preferred arrangements of present invention. The audiovisual product is suitably recorded onto a recording medium such as an optical disk. The DVD-video specification defines a series of data objects that are arranged in a hierarchical structure, with strict limits on the maximum number of objects that exist at each level of the hierarchy. Hence, in one preferred embodiment of the present invention it is desired to create an audiovisual product which meets these and other limitations of the specification. In particular it is desired that the resultant audiovisual product will play on commonly available DVD players. However, it is also desired to create the audiovisual product having a complex navigational structure, in order to increase a user's enjoyment of the product, and in order to allow the creation of new categories of audiovisual products.

In the field of DVD-video, audiovisual content is considered in terms of audio-visual assets (also called AV assets or presentation objects). According to the DVD-video specification each AV asset contains at least one video object, zero or more audio objects, and zero or more sub-picture objects. That is, a section of video data is presented along with synchronised audio tracks and optional sub-picture objects. The current DVD-video specification allows up to eight different audio tracks (audio streams) to be provided in association with up to nine video objects (video angle streams). Typically, the video streams represent different camera angles, whilst the audio streams represent different language versions of a soundtrack such as English, French, Arabic etc. Usually, only one of the available video and audio streams is selected and reproduced when the DVD-video product is played back. Similarly, the current specification allows up to thirty-two sub-picture streams, which are used for functions such as such as language subtitles. Again, typically only one of the sub-picture streams is selected and played back, to give for example a movie video clip with English subtitles from the sub-picture stream reproduced in combination with a French audio stream. Even this relatively simple combination of video, audio and sub-picture streams requires a high degree of co-ordination and effort during authoring, in order to achieve a finished product such as a feature movie. Hence, due to the laborious and expensive nature of the authoring process there is a strong disincentive that inhibits the development of high-quality audiovisual products according to the DVD-video specification. There is then an even stronger impediment against the development of audiovisual products with complex navigational flow or using high numbers of individual raw content objects.

Conveniently, the authoring method of the present invention is implemented as a program, or a suite of programs. The program or programs are recorded on any suitable recording medium, including a removable storage such as a magnetic disk, hard disk or solid state memory card, or as a signal modulated onto a carrier for transmission on any suitable data network, such as the internet.

In use, the authoring method is suitably performed on a computing platform, ideally a general purpose computing platform such as a personal computer or a client-server computing network. Alternatively, the method may be implemented, wholly or at least in part, by dedicated authoring hardware.

As shown in FIG. 1, the authoring method of the preferred embodiment of the present invention comprises three main stages, namely: creating a high-level abstraction (or storyboard) representing functional sections of a desired audiovisual product in step 101; automatically evaluating the high-level abstraction to create a fully expanded intermediate structure and a set of AV assets in step 102; and creating an output datastructure compliant with a DVD-video specification using the expanded intermediate structure and AV assets in step 103. Suitably, the output datastructure is then recorded onto a recording medium, in this case being a blank optical disc, to create a DVD-video product.

The method outlined in FIG. 1 will now be explained in more detail.

Firstly, looking at the step 101 of FIG. 1, the high-level abstraction is created by forming a plurality of components that implicitly represent functional elements of a desired DVD-video product, and a set of transitions that represent movements between the components that will occur during playback.

Figure 2:
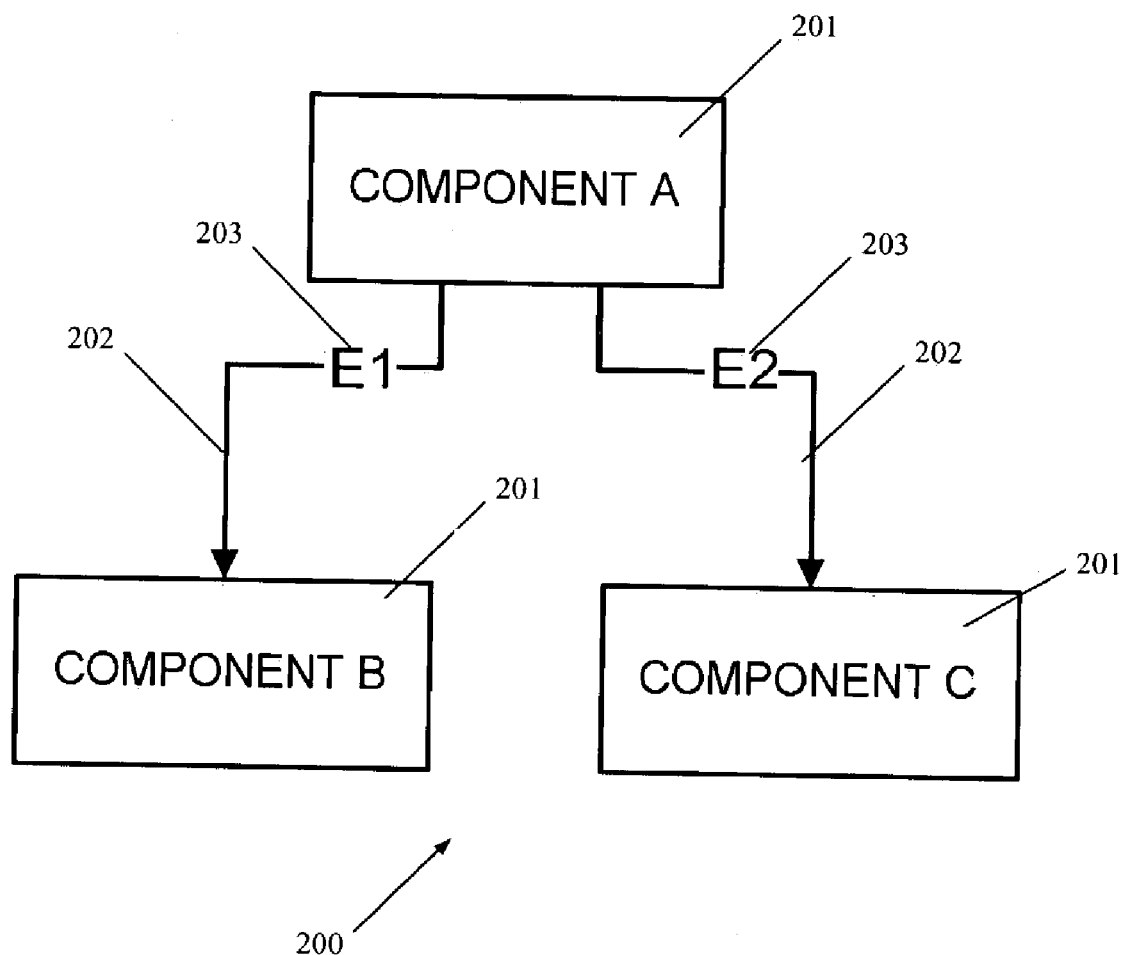
FIG. 2 is a schematic diagram showing a simple abstraction of a desired audiovisual product.

FIG. 2 is a schematic diagram showing a simple abstraction of a desired audiovisual product. In the example of FIG. 2 there are three components 201, linked by two transitions 202. The components 201 represent functional elements of the desired audiovisual product, where one or more portions of AV content (combinations of video clips, audio clips, etc) are to be reproduced during playback. The transitions 202 indicate legitimate ways in which the product moves from one component to another during playback. In the example of FIG. 2, the transitions 202 are all explicitly defined. Suitably, each transition 202 is associated with an event 203, which indicates the circumstances giving rise to that transition. An event 203 is a triggering action such as the receipt of a user command, or the expiry of a timer, that influences movement through the sections of AV content during playback. Referring to FIG. 2, starting from a particular component A, and given all possible actions, exactly one event 203 will be satisfied, allowing a transition 202 from the current component A to a next component B or C.

The preferred embodiment allows for three different types of component. These are an information component, a choice component and a meta-component.

An information component represents what will in due course become a single AV asset in the desired audiovisual product. Suitably, an information component simply comprises a reference to a raw content object or collection of raw content objects (i.e. raw video and audio clips) that will be used to create an AV asset in the audiovisual product. For example, an information component refers to a welcome sequence that is displayed when the DVD-video product is played in a DVD-video player. The same welcome sequence is to be played each time playback begins. It is desired to display the welcome sequence, and then proceed to the next component. An information component (which can also be termed a simple component) is used principally to define presentation data in the desired DVD-video product.

A choice component represents what will become a plurality of AV assets in the desired audiovisual product. In the preferred embodiment, the choice component (alternately termed a multi-component) comprises a reference to at least one raw content object, and one or more parameters. Here, for example, it is desired to present a welcome sequence in one of a plurality of languages, dependent upon a language parameter. That is, both a speaker's picture (video stream) and voice track (audio stream) are changed according to the desired playback language. Conveniently, a choice component is used to represent a set of desired AV assets in the eventual audiovisual product, where a value of one or more parameters is used to distinguish between each member of the set. Hence, a choice component represents mainly presentation data in a desired DVD-video product, but also represents some navigational structure (i.e. selecting amongst different available AV assets according to a language playback parameter).

A meta-component comprises a procedurally-defined structure representing a set of information components and/or a set of choice components, and associated transitions. Conveniently, a meta-component may itself define subsidiary meta-components. A meta-component is used principally to define navigational structure in the desired audiovisual product, by representing other components and transitions.

Figure 3:
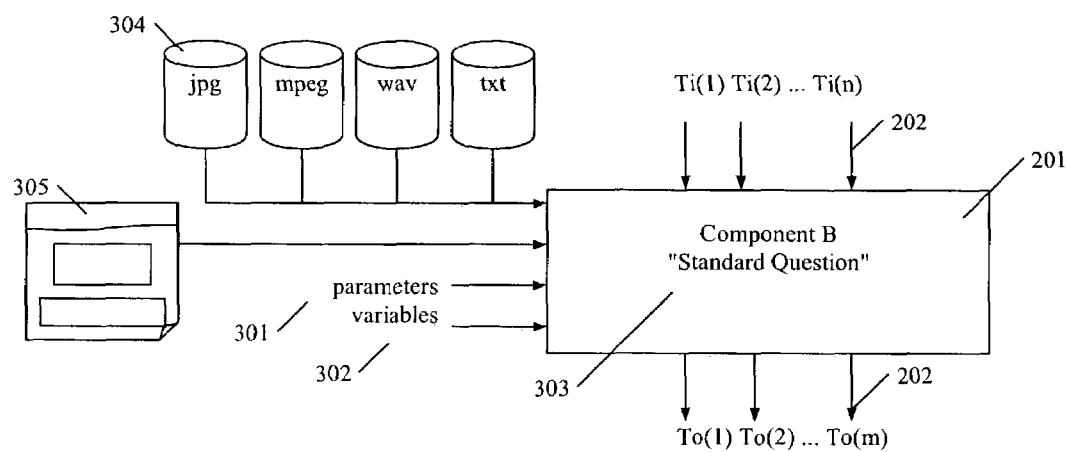
FIG. 3 shows in more detail a component used as part of the abstraction of FIG. 2.

FIG. 3 shows a choice component or information component 201 in more detail. The component is reached by following one of a set of incoming transitions 202, labelled Ti(1 . . . n), and is left by following one of a set of outgoing transitions To(1 . . . m).

The component 201 is defined with reference to zero or more parameters 301, which are used only during the authoring process. However, the component may also be defined with reference to zero or more runtime variables 302. Each variable 302 records state information that can be read and modified within the scope of each component, during playback of the audiovisual product such as in a standard DVD player. Conveniently, the component 201 is provided with a label 303 for ease of handling during the authoring process.

The component 201 contains references to one or more items of content 304. The items of content are raw multimedia objects (still picture images, video clips, audio clips, text data, etc.) recorded in one or more source storage systems such as a file system, database, content management system, or asset management system, in any suitable format such as .gif, .tif, .bmp, .txt, .rtf, .jpg, .mpg, .qtf, .mov, .wav, .rm, .qtx, amongst many others. It will be appreciated that these raw content items are not necessarily at this stage in a format suitable for use in the DVD-video specification, which demands that video, audio and sub-picture objects are provided in selected predetermined formats (i.e. MPEG).

Each component 201 uses the references as a key or index which allows that item of content to be retrieved from the source storage systems. The references may be explicit (e.g. an explicit file path), or may be determined implicitly, such as with reference to values of the parameters 301 and/or variables 302 (i.e. using the parameters 301 and/or variables 302 to construct an explicit file path).

Conveniently, the component 201 also comprises a reference to a template 305. The template 305 provides, for example, a definition of presentation, layout, and format of a desired section of AV content to be displayed on screen during playback. A template 305 draws on one or more items of content 304 to populate the template. Typically, one template 305 is provided for each component 201. However, a single template 305 may be shared between plural components 201, or vice versa. A template 305 is provided in any suitable form, conveniently as an executable program, a plug-in or an active object. A template is conveniently created using a programming language such as C++, Visual Basic, Shockwave or Flash, or by using a script such as HTML or Python, amongst many others. Hence, it will be appreciated that a template allows a high degree of flexibility in the creation of AV assets for a DVD-video product. Also, templates already created for other products (such as a website) may be reused directly in the creation of another form of audiovisual product, in this case a DVD-video product.

The parameters 301, runtime variables 302, content items 304 and template 305 together allow one or more AV assets to be produced for use in the desired audiovisual product. Advantageously, creating a component 201 in this parameterised form allows a large plurality of AV assets to be represented simply and easily by a single component.

To illustrate the power and advantages of creating components 201 and transitions 202 as described above, reference will now be made to FIGS. 4a and 4b which compare a typical prior art method for authoring an audiovisual product against the preferred embodiment of the present invention. In this example it is desired to develop an audiovisual product which allows the user to play a simple quiz game.

Figure 4A:
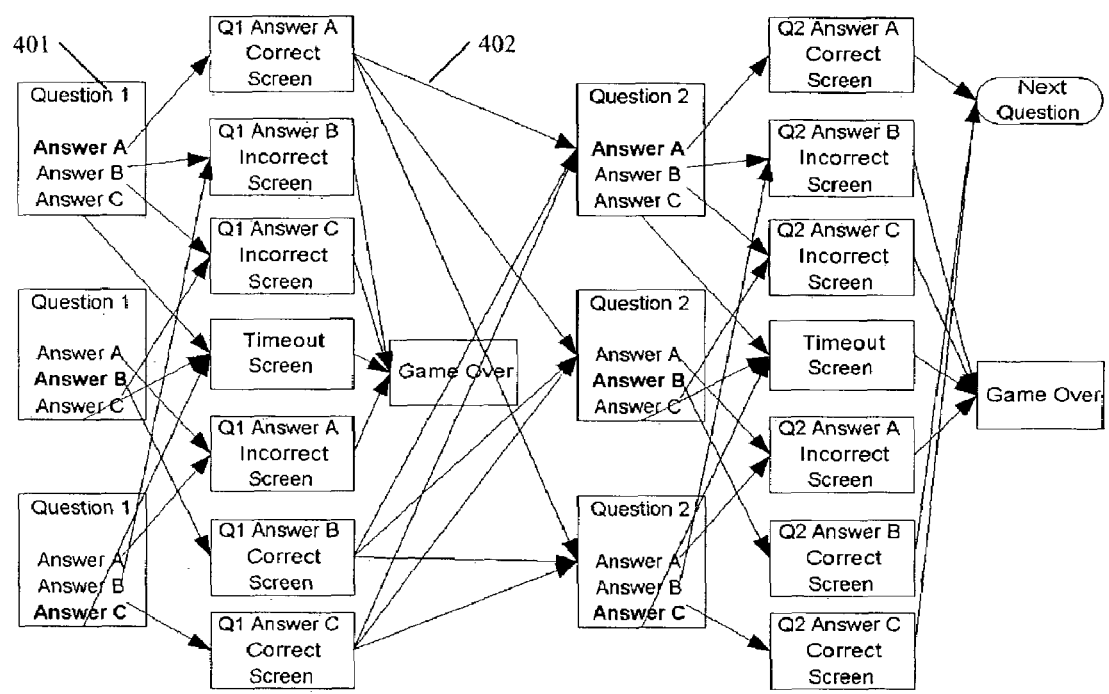
FIG. 4a shows an example of a prior art authoring method.

In FIG. 4a, which illustrates conventional DVD authoring, each AV asset 401 which it is desired to present in the eventual audiovisual product must be created in advance, and navigation between the assets defined using navigation links represented by arrows 402. Here, the game involves answering a first question, and, if correct, then answering a second question. The answer to each question is randomised at runtime using a runtime variable such that one of answers A, B and C is correct, whilst the other two are incorrect. In this simple example of FIG. 4a it can be seen that a large number of assets need to be created, with an even greater number of navigational links. Hence, the process is relatively expensive and time consuming, and is prone to errors.

Figure 4B:
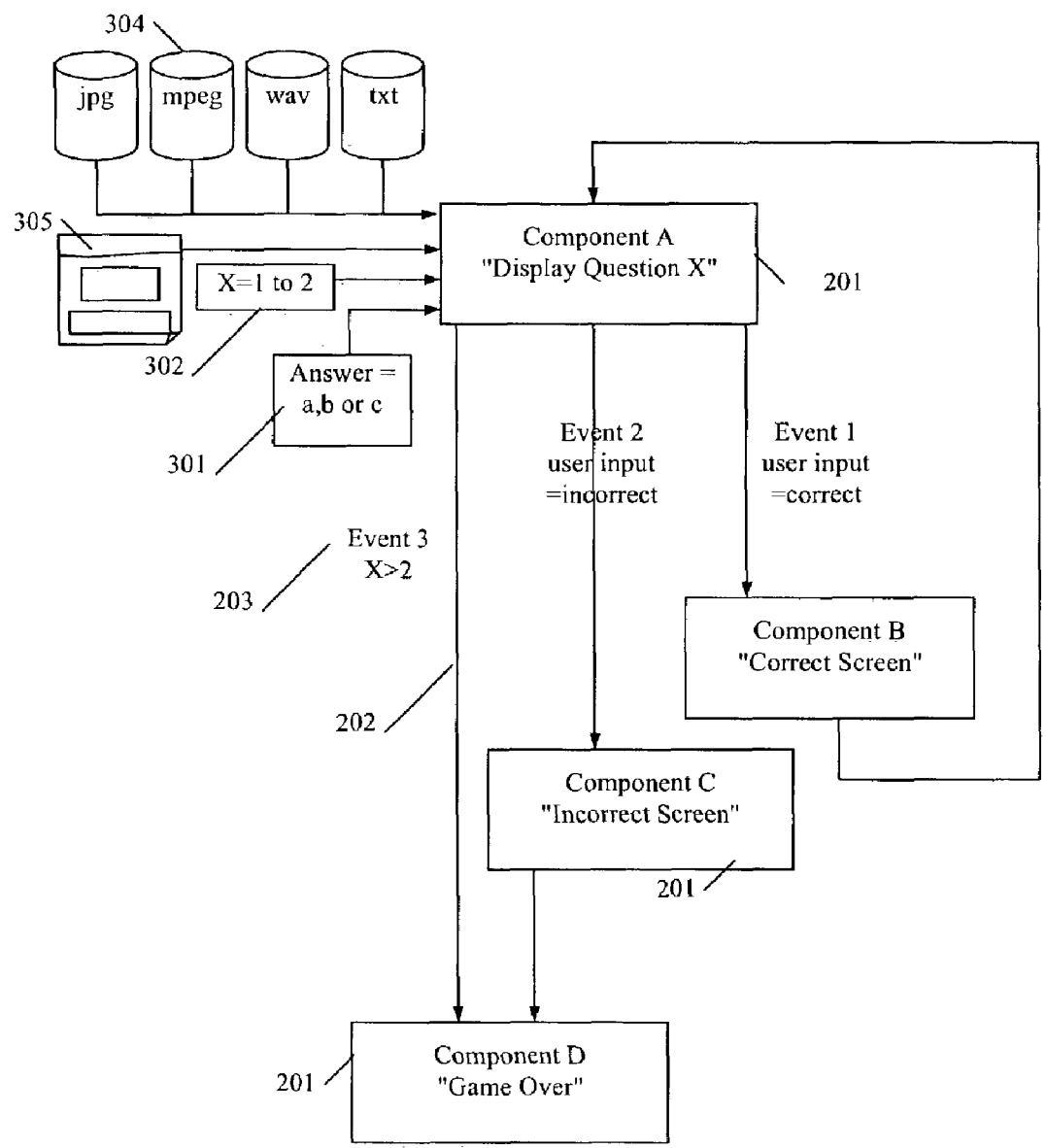
FIG. 4b shows an example authoring method according to a preferred embodiment of the present invention.

FIG. 4b shows an abstraction, using components and transitions according to the present invention as described herein, for an equivalent quiz game. It will be appreciated that the abstraction shown in FIG. 4b remains identical even if the number of questions increases to ten, twenty or even fifty questions, whereas the representation in FIG. 4a becomes even more complex as each question is added.

Figure 5:
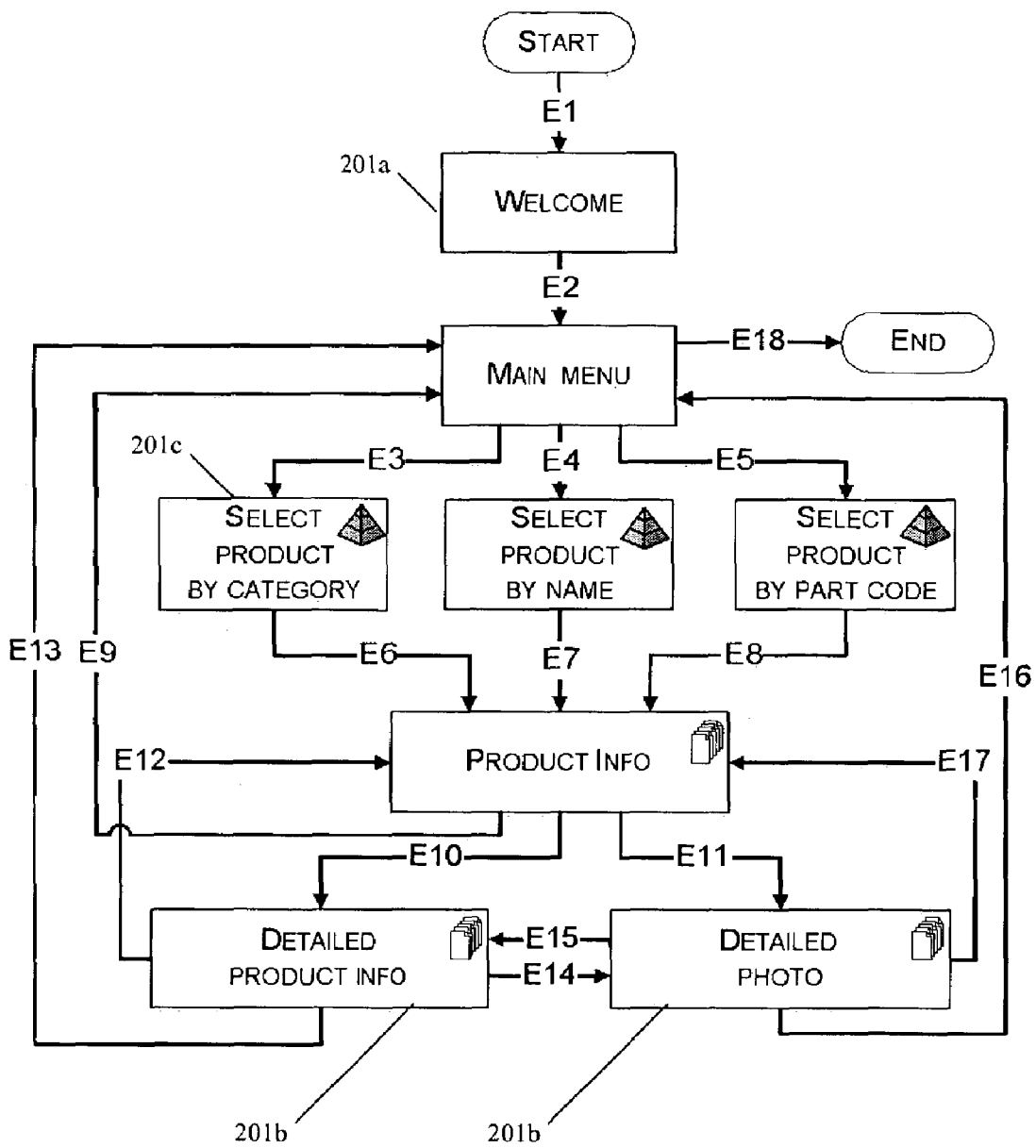
FIG. 5 shows another example embodiment of the present authoring method using components and transitions.

FIG. 5 shows another example abstraction using components and transitions. FIG. 5 illustrates an example abstraction for an audiovisual product that will contain a catalogue of goods sold by a retail merchant. A welcome sequence is provided as an information component 201a. Choice components 201b are used to provide a set of similar sections of AV content such as summary pages of product information, or pages of detailed product information including photographs or moving video, for each product in the catalogue. Here, the catalogue contains, for example, of the order of one thousand separate products, each of which will result in a separate AV asset in the desired DVD-video product. Meta-components 201c provide functions such as the selection of products by category, name or by part code. These meta-components are procedurally defined.

FIG. 6 shows a tabular representation for the abstraction shown in schematic form in FIG. 5.

In use, the authoring method and apparatus suitably presents a convenient user interface for creating components and transitions of the high-level abstraction. Ideally, a graphical user interface is provided allowing the definition of components, transitions and events, similar to the schematic diagram of FIG. 5. Most conveniently, the user interface provides for the graphical creation of components such as by drawing boxes and entering details associated with those boxes, and defining transitions by drawing arrows between the boxes and associating events with those arrows. Alternatively, a tabular textual interface is provided similar to the table of FIG. 6.

Referring again to FIG. 1, the abstraction created in step 101 is itself a useful output. The created abstraction may be stored for later use, or may be transferred to another party for further work. However, in most cases the authoring method is used to automatically create a final audiovisual product, such as a DVD-video product, from the abstraction.

Referring to FIG. 1, the method optionally includes the step 104 of checking for compliance with a DVD specification. It is desired to predict whether the resulting DVD-video product will conform to a desired output specification, in this case the DVD-video specification. For example, the DVD-video specification has a hierarchical structure with strict limits on a maximum number of objects that may exist at each level, and limits on the maximum quantity of data that can be stored on a DVD-video disc.

In one embodiment, the checking step 104 is performed using the created components 201 and transitions 202. As discussed above, the components 201 contain references to raw AV content objects 304 and templates 305, and authoring parameters 301, 302, that allow AV assets to be produced. The checking step 104 comprises predicting a required number of objects at each level of the hierarchical structure, by considering the number of potential AV assets that will be produced given the possible values of the authoring parameters (i.e. authoring-only parameters 301 and runtime variables 302), and provides an indication of whether the limits for the maximum number of objects will be exceeded. Similarly, where a component defines a set of similar AV assets, then it is useful to predict the physical size of those assets, and so check that the audiovisual product is expected to fit within the available capacity of a DVD disc. Advantageously, the conformance check of step 104 is performed without a detailed realisation of every AV asset, whilst providing an operator with a reasonably accurate prediction of expected conformance. If non-conformance is predicted, the operator may then take steps, at this early stage, to remedy the situation. As a result, it is possible to avoid unnecessary time and expense in the preparation of a full audiovisual product which is non-conformant.

Figure 7:
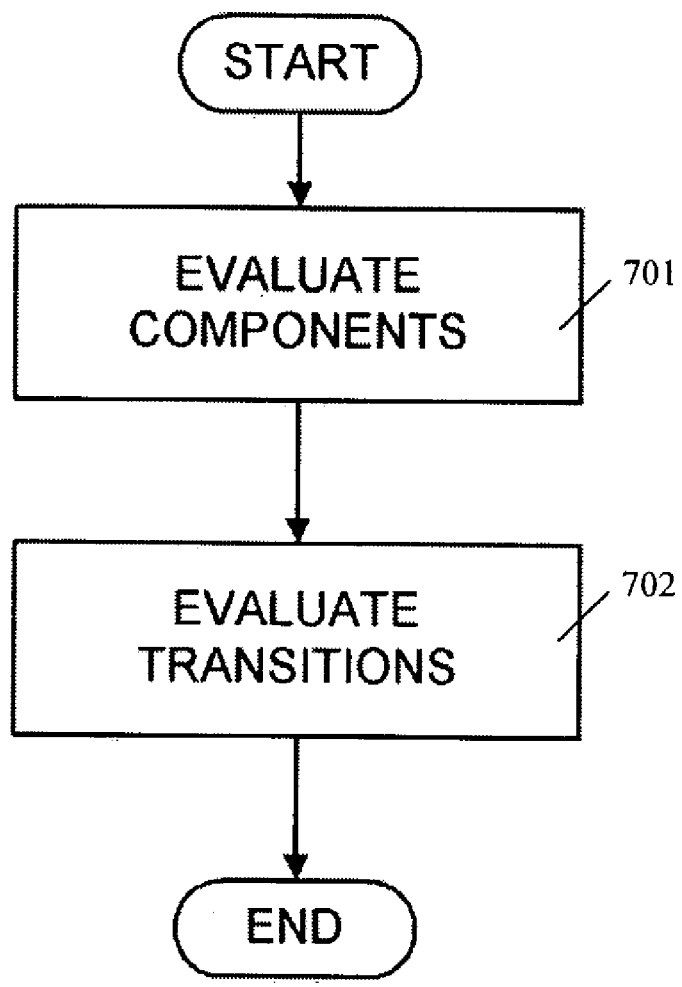
FIG. 7 is an overview of a method for evaluating components and transitions.

As shown in FIG. 1, in step 102 the components 201 and transitions 202 of the high level abstraction 200 are automatically evaluated and expanded to create AV assets and an intermediate datastructure of nodes and links. FIG. 7 shows the step 102 of FIG. 1 in more detail.

The components 201 and transitions 202 may be evaluated in any order, but it is convenient to first evaluate the components, and then to evaluate the transitions. Ideally, any meta-components in the abstraction are evaluated first. Where a meta-component results in new components and transitions, these are added to the abstraction, until all meta-components have been evaluated, leaving only information components and parameterised choice components.

An expanded intermediate datastructure is created to represent the abstract components 201 and transitions 202 in the new evaluated form. This expanded datastructure comprises branching logic derived from the events 203 attached to the transitions 202 (which will eventually become navigation data in the desired audiovisual product) and nodes associated with AV assets derived from the components 201 (which will eventually become presentation data in the audiovisual product). However, it is not intended that the expanded datastructure is yet in a suitable form for creating an audiovisual product in a restricted format such as a DVD-video product, since at this stage there is no mapping onto the hierarchical structure and other limitations of the DVD-video specification.

Figure 8:
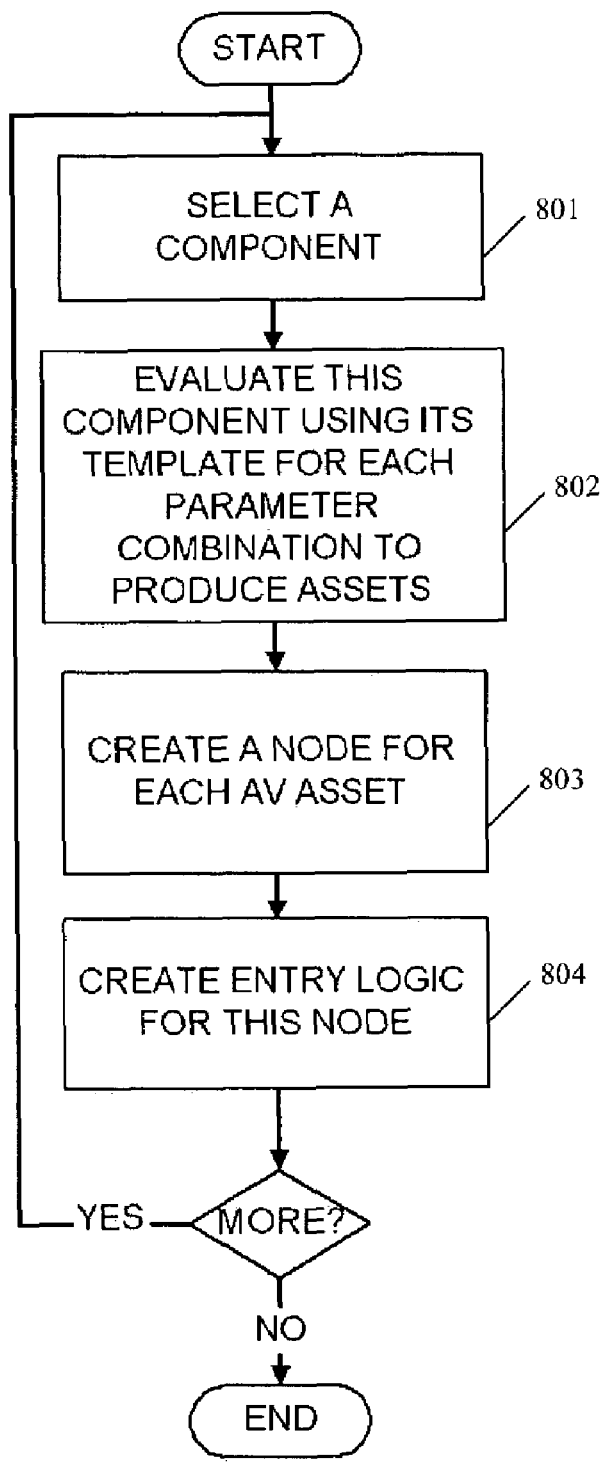
FIG. 8 shows evaluation of components in more detail.

FIG. 8 shows step 701 of FIG. 7 in more detail, to explain the preferred method for evaluating the components 201. As shown in FIG. 8, each information component 201a and each choice component 201b is selected in turn in step 801. Each component 201 is evaluated to provide one or more AV assets in step 802. In an information component, this evaluation comprises creating an AV asset from the referenced raw content objects 304. In a choice component, this evaluation step suitably comprises evaluating a template 305 and one or more raw content objects 304 according to the authoring parameters 301/302, to provide a set of AV assets. Suitably, a node in the expanded datastructure is created to represent each AV asset, at step 803. At step 804, entry logic and/or exit logic is created to represent a link to or from each node such that each AV asset is reached or left under appropriate runtime conditions.

Figure 9:
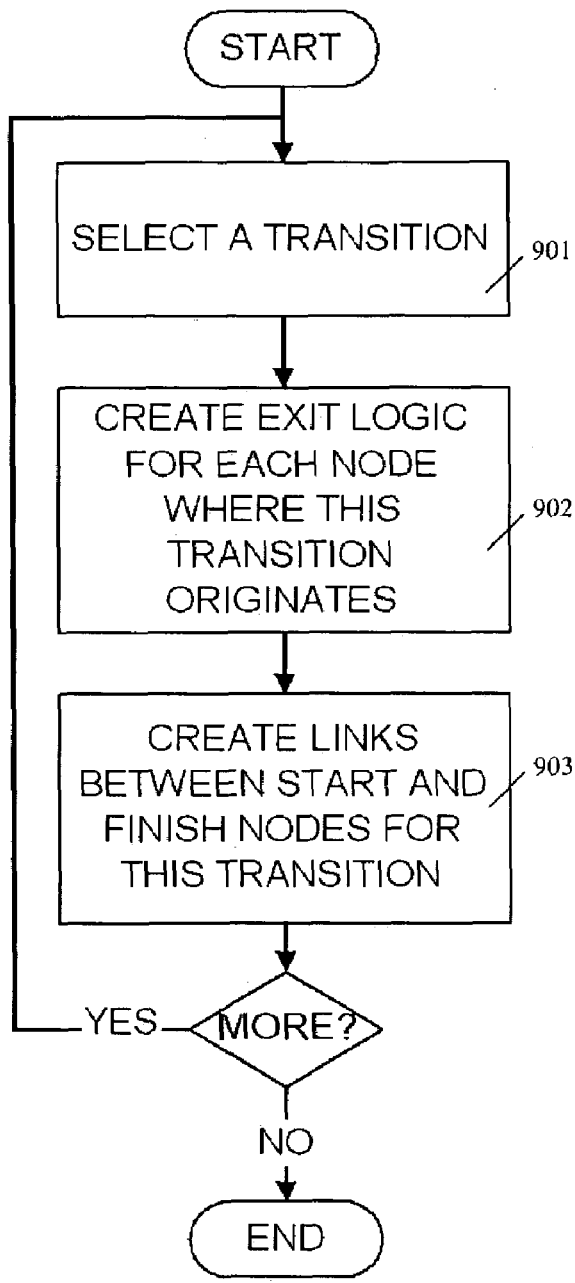
FIG. 9 shows evaluation of transitions in more detail.

FIG. 9 shows a preferred method for evaluating transitions in step 702 of FIG. 7. Each transition 202 is selected in any suitable order in step 901. In step 902 the conditions of the triggering event 203 associated with a particular transition 202 are used to create entry and/or exit logic for each node of the expanded datastructure. In step 903 explicit links are provided between the nodes.

Figure 10:
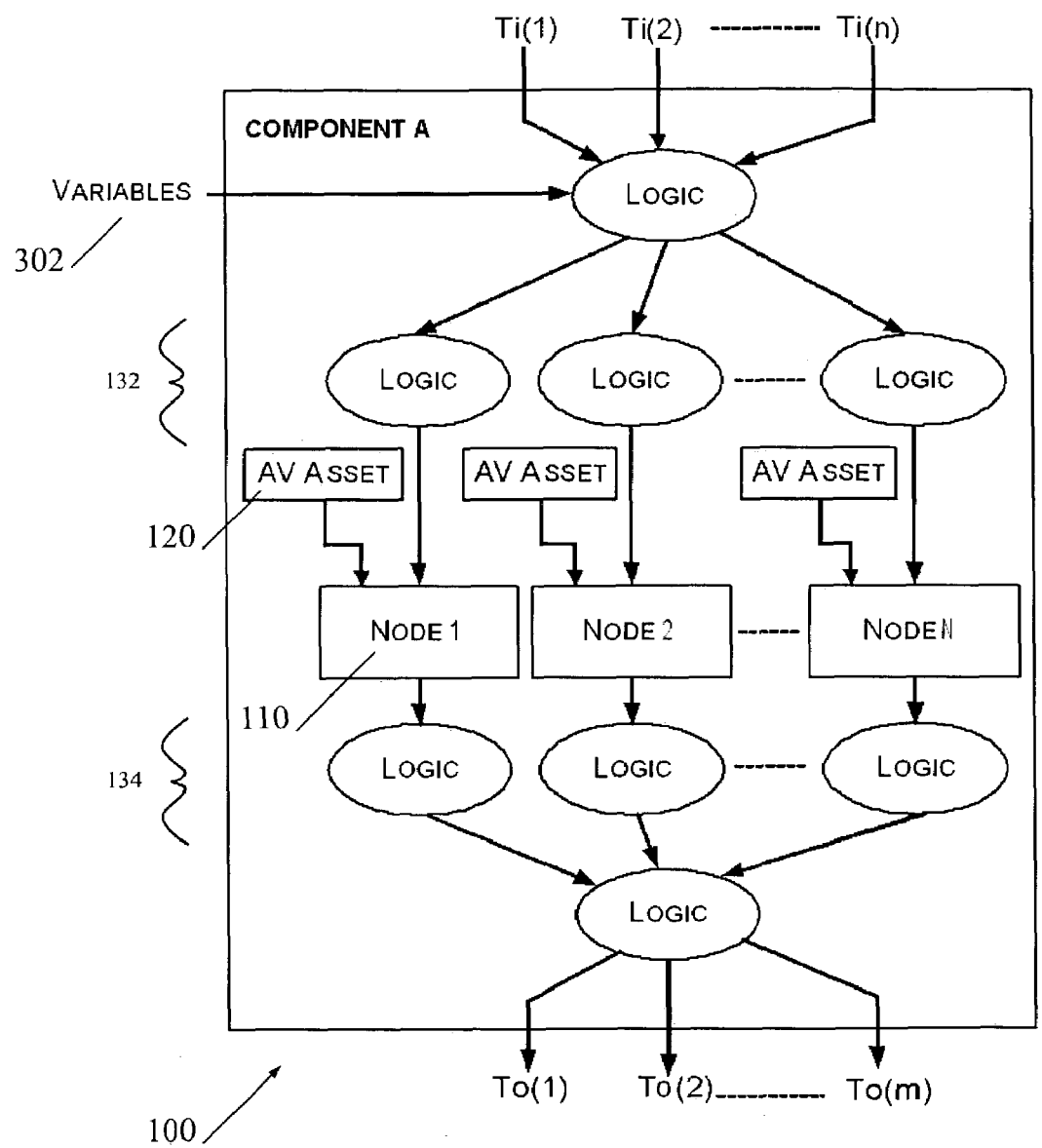
FIG. 10 shows a portion of an expanded datastructure during evaluation of components and transitions.

FIG. 10 is a schematic illustration of a component 201 during evaluation to create a set of nodes 110 each associated with an AV asset 120, together with entry logic 132 and exit logic 134, defining movement between one node 110 and the next. The entry logic 132 and exit logic 134 reference runtime variables 302 which are available during playback (e.g. timer events, player status, and playback states), and the receipt of user commands. Conveniently, the evaluation step consumes each of the authoring-only parameters 301 associated with the abstract components 201, such that only the runtime variables 302 and runtime actions such as timer events and user commands remain.

Referring again to FIG. 1, a conformance checking step 105 may, additionally or alternatively to the checking step 104, be applied following the evaluation step 102. Evaluation of the abstraction in step 102 to produce the expanded datastructure 100 allows a more accurate prediction of expected compliance with a particular output specification. In particular, each node of the expanded datastructure represents one AV asset, such that the total number of AV assets and object locations can be accurately predicted, and the set of AV assets has been created, allowing an accurate prediction of the capacity required to hold these assets. Conveniently, information about conformance or non-conformance is fed back to an operator. Changes to the structure of the product can then be suggested and made in the abstraction, to improve compliance.

Referring to FIG. 1, in step 103 the expanded datastructure from step 102 is used to create an audiovisual product according to a predetermined output format, in this case by creating specific structures according to a desired DVD-video specification.

Figure 11:
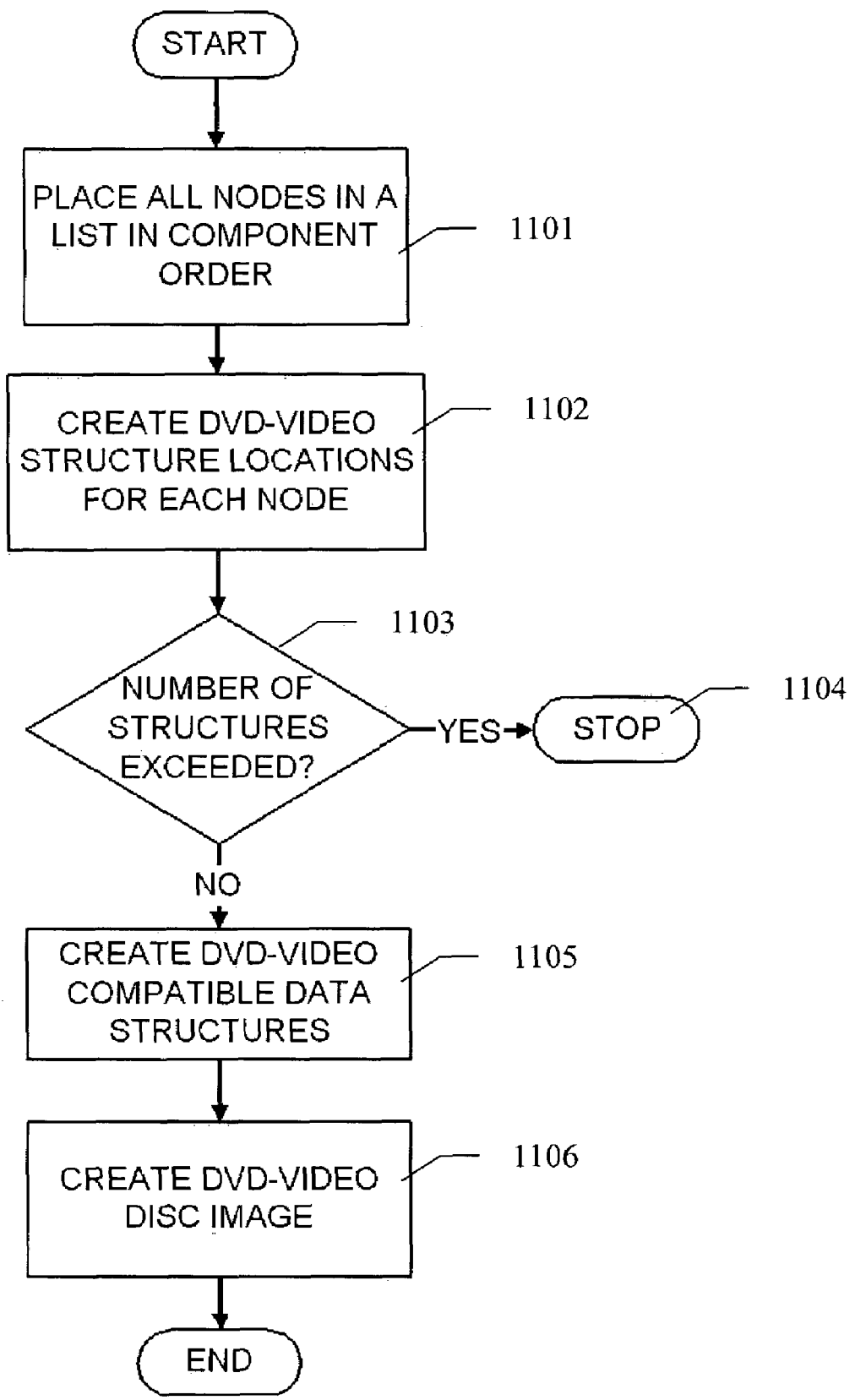
FIG. 11 is an overview of a preferred method for creating DVD-video structures from an expanded datastructure.

FIG. 11 shows an example method for creation of the DVD video structures. In step 1101, the nodes 110 in the expanded datastructure are placed in a list, such as in an order of the abstract components 201 from which those nodes originated, and in order of the proximity of those components to adjacent components in the abstraction. As a result, jumps between DVD video structure locations during playback are minimised and localised, in order to improve playback speed and cohesion.

Each node is used to create a DVD video structure location at step 1102. Optionally at step 1103 if the number of created DVD video structure locations exceeds the specified limit set by the DVD-video specification then creation is stopped at 1104, and an error reported. Assuming the number of structures is within the specified limit then DVD video compatible datastructures are created at step 1105. Finally, a DVD video disc image is created at step 1106. Conveniently, commercially available tools are used to perform step 1106, and need not be described in detail here.

Figure 12:
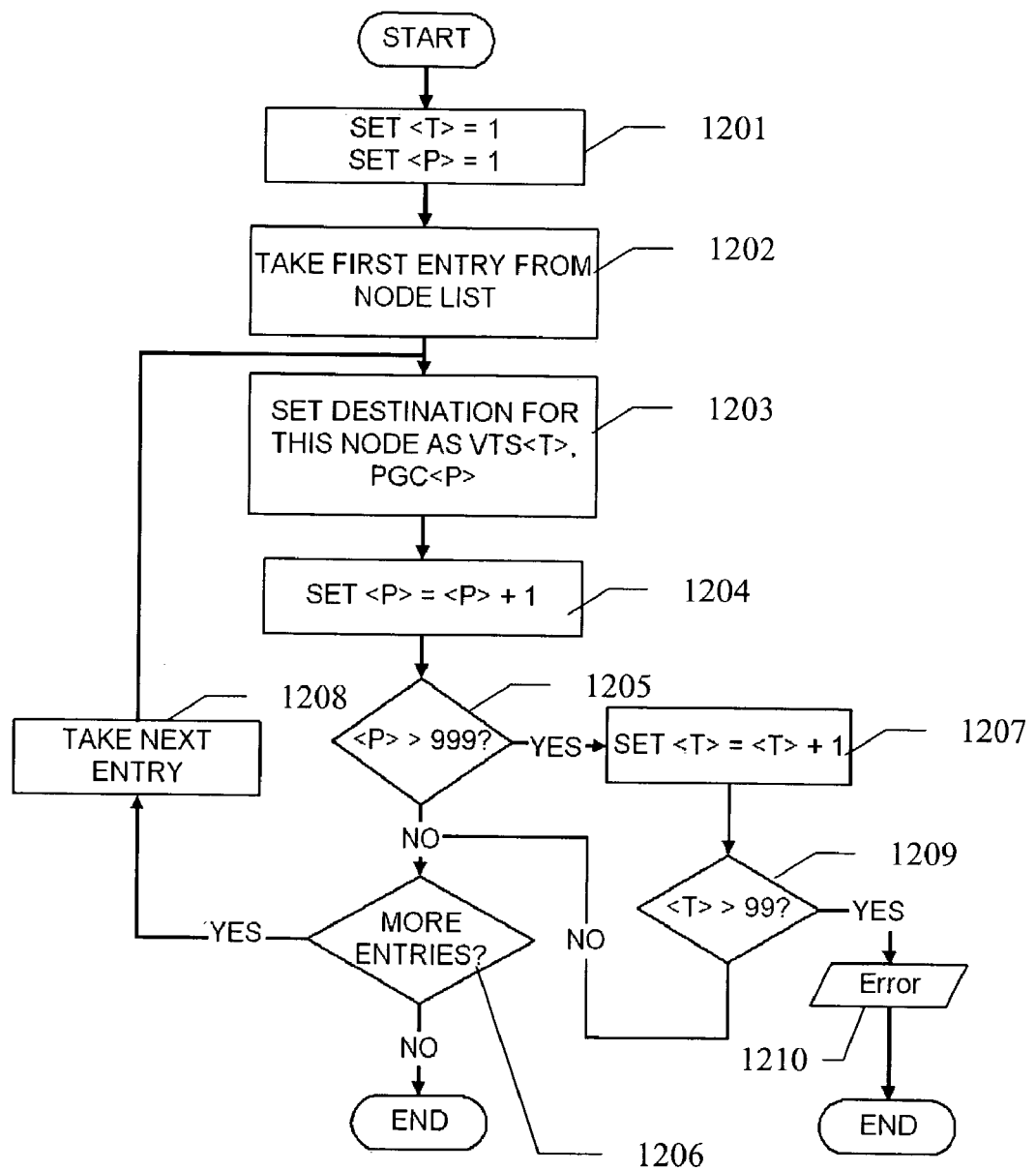
FIG. 12 shows a step of creating DVD video structure locations in more detail.

Step 1102 is illustrated in more detail in FIG. 12. In this example variable T represents a number of a video title set VTS (i.e. from 1-99) whilst variable P represents a program chain PGC (i.e. from 1-999) within each video title set. As shown in FIG. 12 the nodes 110 of the expanded datastructure 100 are used to define locations in the video title sets and program chains. As the available program chains within each video title set are consumed, then the locations move to the next video title set. Here, many alternate methods are available in order to optimise allocation of physical locations to the nodes of the expanded datastructure.

Figure 13:
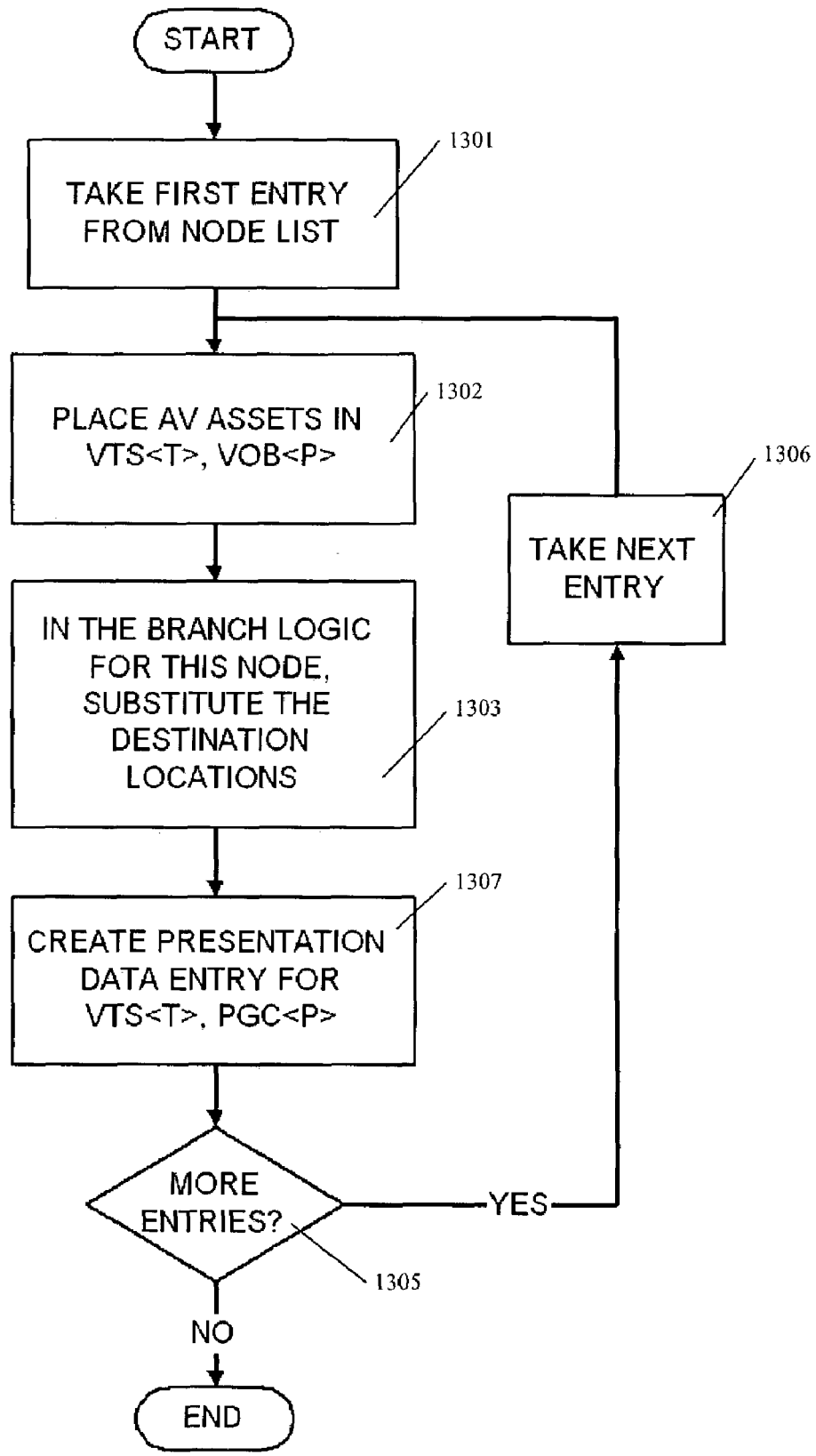
FIG. 13 shows a step of creating DVD-video compatible datastructures in more detail.

Step 1105 of FIG. 11 is illustrated in more detail in FIG. 13. FIG. 13 shows a preferred method for creating DVD-video compatible datastructures by placing the AV assets 120 associated with each node 110 in the structure location assigned for that node, and substituting links between the nodes with explicit references to destination locations. At step 1307 this results in an explicit DVD compatible datastructure which may then be used to create a DVD disc image. Finally, the DVD disc image is used to record a DVD disc as a new audiovisual product.

The DVD authoring method and apparatus described above have a number of advantages. Creating components that represent parameterised sections of audio visual content allow many individual AV assets to be implicitly defined and then automatically created. Repetitive manual tasks are avoided, which were previously time consuming, expensive and error-prone. The authoring method and apparatus significantly enhance the range of features available in existing categories of audiovisual products such as movie presentations. They also allow new categories of audiovisual products to be produced. These new categories include both entertainment products such as quiz-based games and puzzle-based games, as well as information products such as catalogues, directories, reference guides, dictionaries and encyclopedias. In each case, the authoring method and apparatus described herein allow full use of the video and audio capabilities of DVD specifications such as DVD-video. A user may achieve playback using a standard DVD player with ordinary controls such as a remote control device. A DVD-video product having highly complex navigational content is readily created in a manner which is simple, efficient, cost effective and reliable.

Although a few preferred embodiments have been shown and described, it will be appreciated by those skilled in the art that various changes and modifications might be made without departing from the scope of the invention, as defined in the appended claims.

What is claimed is:

1. An authoring method for use in creating an audiovisual product, comprising the steps of:
  defining a plurality of components, the components implicitly representing functional sections of audiovisual content with respect to one or more raw content objects to be used in an audiovisual product, and a plurality of transitions that represent movements between the plurality of components;
  providing to a computer platform an executable code which when executed by the computer platform enables the computer to automatically expand the plurality of components and the plurality of transitions to automatically generate a set of explicitly realized AV assets and an expanded intermediate datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the intermediate datastructure represents a navigational structure of the audiovisual product; and creating the audiovisual product for a playback device in a predetermined output format, using the AV assets and the expanded intermediate datastructure of the nodes and the links, the created audiovisual product having a navigational structure corresponding to a structure represented by the intermediate datastructure.

2. The method of claim 1, wherein the defining step comprises defining at least one information component that comprises a reference to a raw content object.

3. The method of claim 2, wherein the reference denotes a file path to a location where the raw content object is stored.

4. The method of claim 1, wherein the defining step comprises defining at least one choice component comprising a reference to at least one raw content object, and at least one authoring parameter.

5. The method of claim 4, wherein the at least one authoring parameter is adapted to control a selection or modification of the at least one raw content object.

6. The method of claim 4, wherein the at least one authoring parameter comprises a runtime variable available during playback of the audiovisual product.

7. The method of claim 4, wherein the at least one authoring parameter comprises an authoring-only parameter that will not be available during playback of the audiovisual product.

8. The method of claim 4, wherein the choice component comprises a reference to a presentation template and a reference to at least one substitutable raw content object to be placed in the template according to the at least one authoring parameter.

9. The method of claim 1, wherein the defining step comprises defining at least one meta-component representing a set of components and transitions.

10. The method of claim 9, wherein the at least one meta-component is a procedurally defined representation of the set of components and transitions.

11. The method of claim 1, wherein each transition represents a permissible movement from one component to another component.

12. The method of claim 1, wherein each transition is associated with a triggering event.

13. The method of claim 12, wherein the triggering event is an event occurring during playback of the audiovisual product.

14. The method of claim 13, wherein the triggering event is receiving a user command, or expiry of a timer.

15. The method of claim 1, further comprising checking expected conformance of the audiovisual product with the predetermined output format, using the plurality of components and the plurality of transitions.

16. The method of claim 15, wherein the predetermined output format is a hierarchical datastructure having limitations on a number of objects that may exist in the datastructure at each level of the hierarchy, and the checking step comprises predicting an expected number of objects at a level and comparing the expected number with the limitations of the hierarchical datastructure.

17. The method of claim 15, wherein the checking step comprises predicting an expected total size of the audiovisual product, and comparing the expected total size against a storage capacity of a predetermined storage medium.

18. The method of claim 1, wherein the expanding step comprises, for each component, building one or more of the set of explicitly realised AV assets by reading and manipulating the one or more raw content objects.

19. The method of claim 1, wherein:
the defining step comprises defining at least one choice component comprising a reference to a plurality of raw content objects and at least one authoring parameter; and
the expanding step comprises:
selecting one or more raw content objects from amongst the plurality of raw content objects using the at least one authoring parameter; and
combining the selected raw content objects to form one of the AV assets.

20. The method of claim 19, comprising repeating the selecting and combining steps to automatically build a plurality of the explicitly realized AV assets from the one of the components.

21. The method of claim 1, wherein the expanding step comprises:
creating from each one of the plurality of components one or more explicitly realised AV assets to generate the set of AV assets;
creating the expanded intermediate datastructure wherein each node represents one AV asset of the set; and
creating a set of links between the nodes.

22. The method of claim 1, wherein each transition is associated between first and second components, and creating the set of links comprises evaluating each transition to create one or more links, each of the links being between a node created from the first component and a node created from the second component.

23. The method of claim 1, wherein the expanding step comprises evaluating at least one of the transitions to create exit logic associated with at least one first node, evaluating one of the components to create entry logic associated with at least one second node, and providing a link between the first and second nodes according to the entry logic and the exit logic.

24. The method of claim 23, wherein at least one of the transitions is associated with a triggering event, and the expanding step comprises evaluating the triggering event to determine the exit logic associated with the at least first one node.

25. The method of claim 1, further comprising checking expected conformance of the audiovisual product with the predetermined output format, using the AV assets and the expanded intermediate datastructure of nodes and links.

26. The method of claim 25, wherein the predetermined output format is a hierarchical datastructure having limitations on a number of objects that may exist in the datastructure at each level of the hierarchy, and the checking step comprises predicting an expected number of objects at a level and comparing the expected number with the limitations of the hierarchical datastructure.

27. The method of claim 26, wherein the checking step comprises predicting an expected total size of the audiovisual product, and comparing the expected total size against a storage capacity of a predetermined storage medium.

28. The method of claim 1, wherein the AV assets have a data format specified according to the predetermined output format.

29. The method of claim 1, wherein the AV assets each have a data format according to the predetermined output format, whilst the raw content objects are not limited to a data format of the predetermined output format.

30. The method of claim 1, wherein the predetermined output format is a DVD-video specification.

31. The method of claim 1, wherein the AV assets each comprise a video object, zero or more audio objects, and zero or more sub-picture objects.

32. The method of claim 1, wherein the AV assets each comprise at least one video object, zero to eight audio objects, and zero to thirty-two sub-picture objects, according to a DVD-Video specification.

33. The method of claim 1, wherein the creating step comprises creating objects in a hierarchical datastructure defined by the predetermined output format with objects at levels of the datastructure, according to the intermediate datastructure of nodes and links, and where the objects in the hierarchical datastructure include objects derived from the explicitly realised AV assets.

34. The method of claim 1, wherein the predetermined output format is a DVD-Video specification and the creating step comprises creating DVD-Video structure locations from the nodes of the expanded intermediate datastructure, placing the explicitly realised AV assets at the created structure locations, and substituting the links of the expanded intermediate datastructure with explicit references to the DVD-Video structure locations.

35. The method of claim 1, further comprising the step of: recording the audiovisual product onto a recording medium.

36. The method of claim 35, wherein the recording medium is an optical disk.

37. The method of claim 1, wherein the method is implemented by a computer.

38. An authoring method for use in creating a DVD-video product, comprising the steps of:
creating a plurality of components representing parameterised sections of audiovisual content of a DVD-Video format datastructure, and a plurality of transitions representing movements between components;
providing to a computer platform an executable code which when executed by the computer platform enables the computer to automatically expand the plurality of components and the plurality of transitions to automatically generate a set of AV assets and an expanded datastructure of nodes and links, including expanding a component of the plurality of components to automatically generate a plurality of nodes, and expanding a transition of the plurality of transitions to automatically generate a plurality of links, where each node is associated with an AV asset of the set the links represent movement from one node to another and the expanded datastructure represents a navigational structure of the DVD-Video format datastructure; and
creating DVD-video format datastructure from the AV assets for a playback device, using the nodes and links, the created DVD-video format datastructure having a navigational structure corresponding to a structure represented by the expanded datastructure.

39. The method of claim 38, comprising creating at least one information component comprising a reference to an item of AV content.

40. The method of claim 38, comprising creating at least one choice component comprising a reference to at least one item of AV content, and at least one parameter for modifying the item of AV content.

41. The method of claim 40, wherein the choice component comprises a reference to a presentation template and a reference to at least one item of substitutable content to be placed in the template according to the at least one parameter.

42. The method of claim 40, wherein the choice component comprises at least one runtime variable available during playback of an audiovisual product in a DVD player, and at least one authoring parameter not available during playback.

43. The method of claim 40, wherein the expanding step comprises evaluating each choice component to create a plurality of AV assets according to each value of the at least one parameter.

44. The method of claim 43, wherein evaluating each choice component comprises creating entry logic associated with at least one node and/or evaluating at least one transition to create exit logic associated with at least one node, and providing a link between a pair of nodes according to the entry logic and the exit logic.

45. The method of claim 38, comprising creating at least one meta-component representing a set of components and transitions.

46. The method of claim 38, wherein each transition represents a permissible movement from one component to another component, each transition being associated with a triggering event.

47. The method of claim 46, wherein a triggering event includes receiving a user command, or expiry of a timer.

48. The method of claim 38, wherein the expanding step comprises:
creating from each one of the plurality of components one or more AV assets to generate the set of AV assets;
creating the expanded data structure wherein each node represents one AV asset of the set; and
creating a set of links between the nodes.

49. The method of claim 38, comprising checking expected conformance with the DVD-video format using the created components and transitions.

50. The method of claim 38, comprising checking expected conformance with the DVD-video format using the set of AV assets and the expanded datastructure of nodes and links.

51. The method of claim 38, further comprising the step of: recording the DVD-Video product onto a recording medium.

52. The method of claim 51 wherein the recording medium is an optical disk.

53. The method of claim 38, wherein the method is implemented by a computer.

54. An authoring method for use in creating an audiovisual product according to a DVD-video specification, comprising the steps of:
creating a plurality of components and a plurality of transitions, where a component implicitly defines a plurality of AV assets by referring to a presentation template and to items of raw content substitutable in the presentation template, the raw content being for use in an DVD-video format datastructure, and the plurality of transitions represent navigational movements between components; and
providing to a computer platform an executable code which when executed by the computer platform enables the computer to automatically expand the plurality of components and the plurality of transitions to automatically generate a set of AV assets where each of the set of AV assets comprises a video object, zero or more audio objects and zero or more sub-picture objects, and to automatically generate an expanded datastructure of nodes and links, including expanding a component of the plurality of components to automatically generate a plurality of nodes, and expanding a transition of the plurality of transitions to automatically generate a plurality of links, where each node is associated with one AV asset of the set, the links represent navigational movement from one node to another and the expanded datastructure represents a navigational structure of the DVD-video format datastructure; and creating the DVD-video format datastructure from the set of AV assets for a playback device, using the nodes and links, the created DVD-video format datastructure having a navigational structure corresponding to a structure represented by the expanded datastructure.

55. The method of claim 54, further comprising the step of: recording the DVD-Video product onto a recording medium.

56. The method of claim 55 wherein the recording medium is an optical disk.

57. The method of claim 54, wherein the method is implemented by a computer.

58. A storage medium on which is stored a computer program for creating an audiovisual product, the computer program comprising instructions which when executed by a computer, perform the steps of:

defining a plurality of components, the components implicitly representing functional sections of audiovisual content with respect to one or more raw content objects to be used in an audiovisual product, and a plurality of transitions that represent movements between the plurality of components;

automatically expanding the plurality of components and the plurality of transitions to automatically generate a set of explicitly realised AV assets and an expanded intermediate datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the intermediate datastructure represents a navigational structure of the audiovisual product; and creating the audiovisual product for a playback device in a predetermined output format, using the AV assets and the expanded intermediate datastructure of the nodes and the links, the created audiovisual product having a navigational structure corresponding to a structure represented by the intermediate datastructure.

59. A storage medium on which is stored a computer program for creating an audiovisual product, the computer program comprising instructions which when executed by a computer, perform the steps of:

creating a plurality of components representing parameterised sections of audiovisual content of a DVD-Video format datastructure, and a plurality of transitions representing movements between components;

automatically expanding the plurality of components and the plurality of transitions to automatically generate a set of AV assets and an expanded datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the expanded datastructure represents a navigational structure of the DVD-video format datastructure; and creating the DVD-Video format datastructure from the AV assets for a playback device, using the nodes and links, the created DVD-video format datastructure having a navigational structure corresponding to a structure represented by the expanded datastructure.

60. A storage medium on which is stored a computer program for creating an audiovisual product, the computer program comprising instructions which when executed by a computer, perform the steps of:

creating a plurality of components and a plurality of transitions, where a component implicitly defines a plurality of AV assets by referring to a presentation template and to items of raw content substitutable in the presentation template, the raw content being for use in a DVD-Video format datastructure, and the plurality of transitions represent navigational movements between components; and automatically expanding the plurality of components and the plurality of transitions to automatically generate a set of AV assets where each of the set of AV assets comprises a video object, zero or more audio objects and zero or more sub-picture objects, and to automatically generate an expanded datastructure of nodes and links, including expanding a component of the plurality of components to automatically generate a plurality of nodes, and expanding a transition of the plurality of transitions to automatically generate a plurality of links, where each node is associated with one AV asset of the set, the links represent navigational movement from one node to another and the expanded datastructure represents a navigational structure of the DVD-video format datastructure; and creating the DVD-video format datastructure from the set of AV assets for a playback device, using the nodes and links, the created DVD-video format datastructure having a navigational structure corresponding to a structure represented by the expanded datastructure.

61. A storage medium on which is stored a computer program for creating an audiovisual product, the computer program comprising instructions which when executed by a computer, perform the steps of:

defining a plurality of components, the components implicitly representing functional sections of audiovisual content with respect to one or more raw content objects for use in an audiovisual product, and a plurality of transitions that represent movements between the plurality of components;

automatically expanding the plurality of components and the plurality of transitions to automatically generate a set of explicitly realised AV assets and an expanded intermediate datastructure of nodes and links, including expanding a component of the plurality of components to automatically generate a plurality of nodes, and expanding a transition of the plurality of transitions to automatically generate a plurality of links, where each node is associated with an AV asset of the set and the links represent movement from one node to another and the intermediate datastructure represents a navigational structure of the audiovisual product; and creating the audiovisual product recorded on a physical recording medium for a playback device in a predetermined output format, using the AV assets and the expanded intermediate datastructure of the nodes and the links, the created audiovisual product having a navigational structure corresponding to a structure represented by the intermediate datastructure, the navigational structure structured and arranged as executable code for the playback device, which when executed by the playback device will direct the playback of the AV assets in accordance with the navigational structure.

62. An optical disk having recorded thereon an audiovisual product with a navigational structure structured and arranged as executable code for a playback device, which when executed by the playback device will direct the playback in accordance with the navigational structure, the audiovisual product authored by the steps of:

creating a plurality of components representing parameterised sections of audiovisual content of a DVD-Video format datastructure, and a plurality of transitions representing movements between components;

providing to a computer platform an executable code which when executed by the computer platform enables the computer to automatically expand the plurality of components and the plurality of transitions to automatically generate a set of AV assets and an expanded datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the expanded datastructure represents a navigational structure of the DVD-Video format datastructure; and creating the DVD-Video format datastructure recorded on an optical disk from the AV assets, using the nodes and links, the created DVD-video format datastructure having a navigational structure corresponding to a structure represented by the expanded datastructure, the navigational structure structured and arranged as executable code for the playback device, which when executed by the playback device will direct the playback of the AV assets in accordance with the navigational structure.

63. An optical disk having recorded thereon an audiovisual product with a navigational structure structured and arranged as executable code for a playback device, which when executed by the playback device will direct the playback in accordance with the navigational structure, the audiovisual product authored by the steps of:

creating a plurality of components and a plurality of transitions, where a component implicitly defines a plurality of AV assets by referring to a presentation template and to items of raw content substitutable in the presentation template, the raw content being for use in a DVD-Video format datastructure, and the plurality of transitions represent navigational movements between components;

providing to a computer platform an executable code which when executed by the computer platform enables the computer to automatically expand the plurality of components and the plurality of transitions to automatically generate a set of AV assets where each of the set of AV assets comprises a video object, zero or more audio objects and zero or more sub-picture objects, and to automatically generate an expanded datastructure of nodes and links, including expanding a component of the plurality of components to automatically generate a plurality of nodes, and expanding a transition of the plurality of transitions to automatically generate a plurality of links, where each node is associated with one AV asset of the set, the links represent navigational movement from one node to another and the expanded data structure represents a navigational structure of the DVD-Video format datastructure; and creating the DVD-Video format datastructure recorded on an optical disk from the set of AV assets, using the nodes and links, the created DVD-video format datastructure having a navigational structure corresponding to a structure represented by the expanded datastructure, the navigational structure structured and arranged as executable code for the playback device, which when executed by the playback device will direct the playback of the AV assets in accordance with the navigational structure.

64. A method of creating an optical disk product, comprising recording onto an optical disk an audiovisual product which has been created by the steps of:

defining a plurality of components, the components implicitly representing functional sections of audiovisual content with respect to one or more raw content objects for use in an audiovisual product, and a plurality of transitions that represent movements between the plurality of components;

providing to a computer platform an executable code which when executed by the computer platform enables the computer to automatically expand the plurality of components and the plurality of transitions to automatically generate a set of explicitly realised AV assets and an expanded intermediate datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the intermediate datastructure represents a navigational structure of the audiovisual product; and creating the audiovisual product recorded on an optical disk in a predetermined output format, using the AV assets and the expanded intermediate datastructure of the nodes and the links, the created audiovisual product having a navigational structure corresponding to a structure represented by the intermediate datastructure, the navigational structure structured and arranged as executable code for a playback device, which when executed by the playback device will direct the playback of the AV assets in accordance with the navigational structure.

65. A method of creating an optical disk product, comprising recording onto an optical disk a DVD-Video product which has been created by the steps of:

creating a plurality of components representing parameterised sections of audiovisual content of a DVD-Video format data structure, and a plurality of transitions representing movements between components;

providing to a computer platform an executable code which when executed by the computer platform enables the computer to automatically expand the plurality of components and the plurality of transitions to automatically generate a set of AV assets and an expanded data structure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the expanded data structure represents a navigational structure of the DVD-Video format datastructure; and creating the DVD-Video format datastructure recorded on an optical disk from the AV assets, using the nodes and links, the created DVD-video format datastructure having a navigational structure corresponding to a structure represented by the expanded datastructure.

66. A method of creating an optical disk product, comprising recording onto an optical disk an audiovisual product which has been created by the steps of:

creating a plurality of components and a plurality of transitions, where a component implicitly defines a plurality of AV assets by referring to a presentation template and to items of raw content substitutable in the presentation template, the raw content being for use in a DVD-Video format datastructure, and the plurality of transitions represent navigational movements between components; and providing to a computer platform an executable code which when executed by the computer platform enables the computer to automatically expand the plurality of components and the plurality of transitions to automatically generate a set of AV assets where each of the set of AV assets comprises a video object, zero or more audio objects and zero or more sub-picture objects, and to automatically generate an expanded data structure of nodes and links, including expanding a component of the plurality of components to automatically generate a plurality of nodes, and expanding a transition of the plurality of transitions to automatically generate a plurality of links, where each node is associated with one AV asset of the set, the links represent navigational movement from one node to another and the expanded datastructure represents a navigational structure of the DVD-Video format datastructure;

creating the DVD-Video format datastructure recorded on an optical disk from the set of AV assets, using the nodes and links, the created DVD-video format datastructure having a navigational structure corresponding to a structure represented by the expanded datastructure, the navigational structure structured and arranged as executable code for a playback device, which when executed by the playback device will direct the playback of the AV assets in accordance with the navigational structure.

67. A computing platform comprising a storage medium storing thereon computer executable instructions which when executed by the computing platform perform the steps of:

defining a plurality of components, the components implicitly representing functional sections of audiovisual content with respect to one or more raw content objects for use in an audiovisual product, and a plurality of transitions that represent movements between the plurality of components;

automatically expanding the plurality of components and the plurality of transitions to automatically generate a set of explicitly realised AV assets and an expanded intermediate datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the intermediate datastructure represents a navigational structure of the audiovisual product; and creating the audiovisual product for a playback device in a predetermined output format, using the AV assets and the expanded intermediate datastructure of the nodes and the links, the created audiovisual product having a navigational structure corresponding to a structure represented by the intermediate datastructure.

68. A computing platform comprising a storage medium storing thereon computer executable instructions which when executed by the computing platform perform the steps of:

creating a plurality of components representing parameterised sections of audiovisual content of a DVD-Video format datastructure, and a plurality of transitions representing movements between components;

automatically expanding the plurality of components and the plurality of transitions to automatically generate a set of AV assets and an expanded datastructure of nodes and links, including expanding a component of the plurality of components to automatically generate a plurality of nodes, and expanding a transition of the plurality of transitions to automatically generate a plurality of links, where each node is associated with an AV asset of the set, the links represent movement from one node to another and the expanded datastructure represents a navigational structure of the DVD-Video format datastructure; and creating the DVD-Video format datastructure from the AV assets for a playback device, using the node sand links, the created DVD-video format datastructure having a navigational structure corresponding to a structure represented by the expanded datastructure.

69. A computing platform comprising a storage medium storing thereon computer executable instructions which when executed by the computing platform perform the steps of:

creating a plurality of components and a plurality of transitions, where a component implicitly defines a plurality of AV assets by referring to a presentation template and to items of raw content substitutable in the presentation template, the raw content being for use in a DVD-Video format datastructure, and the plurality of transitions represent navigational movements between components; and automatically expanding the plurality of components and the plurality of transitions to automatically generate a set of AV assets where each of the set of AV assets comprises a video object, zero or more audio objects and zero or more sub-picture objects, and to automatically generate an expanded datastructure of nodes and links, including expanding a component of the plurality of components to automatically generate a plurality of nodes, and expanding a transition of the plurality of transitions to automatically generate a plurality of links, where each node is associated with one AV asset of the set, the links represent navigational movement from one node to another and the expanded datastructure represents a navigational structure of the DVD-Video format datastructure;

creating the DVD-Video format datastructure from the set of AV assets for a playback device, using the nodes and links, the created DVD-video format datastructure having a navigational structure corresponding to a structure represented by the expanded datastructure, the navigational structure structured and arranged as executable code for the playback device, which when executed by the playback device will direct the playback of the AV assets in accordance with the navigational structure.

* * * * *